United States Patent [19]

Matsumoto et al.

[11] Patent Number: 4,811,808
[45] Date of Patent: Mar. 14, 1989

[54] ACCELERATION SLIP CONTROL DEVICE FOR A WHEELED VEHICLE

[75] Inventors: Shinichi Matsumoto; Kiyotaka Ise, both of Susono; Hiroharu Miyazaki, Toyota, all of Japan

[73] Assignee: Toyota Jidosha Kabushiki Kaisha, Aichi, Japan

[21] Appl. No.: 109,303

[22] Filed: Oct. 16, 1987

[30] Foreign Application Priority Data

Oct. 27, 1986 [JP] Japan .................................. 61-254996

[51] Int. Cl.$^4$ ........................ B60K 28/16; F02D 29/02
[52] U.S. Cl. .............................. 180/197; 123/198 DB; 303/100; 364/426.01
[58] Field of Search ........................ 180/197; 364/426; 303/100; 123/198 DB

[56] References Cited

U.S. PATENT DOCUMENTS

| | | | |
|---|---|---|---|
| 3,776,355 | 12/1973 | Scherenberg | 180/197 |
| 3,802,529 | 4/1974 | Burckhardt et al. | 180/197 |
| 3,938,611 | 2/1976 | Bertolasi | 180/197 |
| 4,075,538 | 2/1978 | Plunkett | 318/52 |
| 4,545,455 | 10/1985 | Kanemura et al. | 180/197 |
| 4,554,990 | 11/1985 | Kamiya et al. | 180/197 |
| 4,615,410 | 10/1986 | Hosaka | 180/197 |
| 4,637,487 | 1/1987 | Nakamura et al. | 180/197 |
| 4,682,667 | 7/1987 | Hosaka | 180/197 |
| 4,736,814 | 4/1988 | Yogo et al. | 123/198 DB X |

FOREIGN PATENT DOCUMENTS

| | | |
|---|---|---|
| 0064669 | 11/1982 | European Pat. Off. . |
| 0089492 | 9/1983 | European Pat. Off. . |
| 2832739 | 2/1980 | Fed. Rep. of Germany . |
| 128057 | 7/1985 | Japan .................................. 180/197 |
| 60-130585 | 12/1986 | Japan . |
| 60-147277 | 1/1987 | Japan . |

Primary Examiner—David M. Mitchell
Assistant Examiner—Mitchell J. Hill
Attorney, Agent, or Firm—Parkhurst, Oliff & Berridge

[57] ABSTRACT

The invention relates to an acceleration slip control device, wherein the control quantity for the throttle valve angle operation is determined not only in response to the slip condition but also to the output torque changeability of the internal combustion engine with regard to the throttle valve angle displacement, therefore the output torque of the engine can be effectively restrained to the optimum value counteractive to the slip condition of the driving wheels.

9 Claims, 7 Drawing Sheets

FIG. 5

ENGINE SPEED NE (×100 rpm)

| θ (°) \ NE (rpm) | 0 | 4 | 8 | 12 | 16 | 20 | 24 | 28 | 32 | 36 | 40 | 44 | 48 | 52 | 56 |
|---|---|---|---|---|---|---|---|---|---|---|---|---|---|---|---|
| 0 | 1.0 | ↔ | 1.0 | 1.13 | 1.31 | ↔ | 1.31 | 1.5 | 1.5 | 1.75 | 1.88 | 1.88 | 1.87 | 2.19 | 2.19 |
| 4 | 1.44 | ↔ | ↑ | 1.44 | 1.38 | 1.38 | 1.31 | 1.5 | 1.56 | 1.75 | 1.88 | 1.88 | 1.88 | 2.19 | 2.19 |
| 8 | 1.94 | ↕ | ↑ | ↑ | 1.94 | 1.81 | 1.31 | 1.5 | 1.56 | 1.75 | 2.19 | 1.88 | 1.87 | 2.19 | 2.19 |
| 12 | 4 | ↕ | 4 | 2.75 | 1.94 | 1.81 | 1.37 | 1.5 | 1.56 | 1.75 | 2.19 | 1.88 | 1.81 | 2.19 | 2.19 |
| 16 | 4 | ↕ | 4 | ↑ | ↔ | 2.75 | 2.37 | 1.94 | 1.94 | 1.75 | 2.19 | 1.88 | 1.87 | 2.19 | 2.19 |
| 20 | 4 | ↓ | 4 | 2.75 | ↔ | ↔ | 2.62 | 2.19 | 2.5 | 2.5 | 2.31 | 2.06 | 2.19 | ↔ | ↔ |
| 24 | 4 | ↓ | 4 | ↑ | 3.44 | 3.69 | 2.75 | 2.75 | 2.5 | 2.5 | 2.31 | 2.06 | 2.19 | ↔ | 2.75 |
| 28 | 4 | ↓ | ↑ | 4 | ↑ | 4 | ↔ | ↔ | 4 | 4 | 3.06 | 2.75 | ↑ | ↑ | 2.75 |
| 32 | 4 | ↓ | ↑ | ↑ | 3.69 | ↑ | ↑ | ↑ | ↑ | ↑ | 4 | ↑ | 2.75 | 3.69 | 3.69 |
| 36 | 4 | ↓ | ↑ | ↑ | 4 | ↑ | ↑ | ↑ | ↑ | ↑ | ↑ | ↑ | ↑ | ↑ | 4 |

THROTTLE VALVE ANGLE

ACCELERATION SLIP CONTROL DEVICE FOR A WHEELED VEHICLE

BACKGROUND OF THE INVENTION

This invention relates to an acceleration slip control device for a wheeled vehicle, which counteracts the acceleration slip occurring at the driving wheels of a wheeled vehicle on an incipient driving moment or in driving. More particularly, the device presented herein controls the extent of opening or closing of a throttle valve in order to control the output torque of an internal combustion engine thereby enabling restraint of the acceleration slip.

Conventionally, slip of the driving wheels, which is caused by the urgent acceleration on a starting moment or in driving of the vehicle, produces several undesirable results. It not only worsens tire abrasions but also deteriorates driving performance due to a decreasing lateral drag force existing in the contact of the tires and the road surface, and moreover wastefully increases fuel consumption.

Previous attempts have been made at overcoming or counteracting the aforementioned undesirable results. For instance, some other inventions were disclosed to restrain the acceleration slip, notably the Japanese Applications Nos. Sho 60-130585 and 60-147277. In these applications, the deviation between the rotational speed of the driving wheels and the running speed of the vehicle is indicative of the slip condition, according to which the throttle valve angle is controlled to the proper extent and output torque can be thus restrained. Adjustment of the throttle valve angle controls the output torque of the internal combustion engine, so that the acceleration step occurring during the vehicle's acceleration could be restrained and the desired slip ratio could be accomplished at that moment.

As has been known, as the throttle valve angle changes, the rate and degree of change of the output torque of the internal combustion engine varies significantly as a function of the driving condition of the internal combustion engine. The driving condition of the internal combustion engine can be affected by the rotational speed of the engine, a negative pressure in an intake passage and so on. FIG. 7 graphically illustrates such a relationship wherein the determination of the output torque varies with respect to the engine speed as the throttle valve angle gets smaller. Therefore, in the inventions disclosed in the Japanese applications, the control quantity on the throttle valve operation is determined in connection with the operational condition of the internal combustion engine, producing the maximum torque deterioration for the minimum throttle valve angle displacement. The utput torque is thus modified to the most adequate extent, avoiding excessive torque modification such as to extremely lower the rotational speed of the driving wheels, or to sometimes reproduce the slip.

Accordingly, the acceleration slip controllers previously known could set the proper output torque under the driving condition, where the output torque abruptly decreases as the throttle valve angle is modified to be even slightly smaller, so that the output torque could be properly restrained to counteract the acceleration slip. Nevertheless as a matter of fact, under some other conditions, namely under the condition where the output torque deteriorates very gradually as the throttle valve angle is modified to be smaller, the operation thereof results in dull responsiveness of output torque restraint. It is obviously seen by the graph of FIG. 7, wherein an equal change in valve angle may result in either an effifcient restraint as in the lower half of the graph, or an insensible degree of deterioration as in the upper portion of the graph. Because the conventional controller usually determines the throttle valve angle modificationn in the same manner as during the former driving condition, there is insufficient control quantity for the valve angle in the latter condition and the output torque is not effectively restrained.

As described hereinbefore in the prior art acceleration slip controllers, the variation in degree and rate of change of the output torque deterioration with respect to the throttle valve angle has not yet been designated and moreover the control quantity of the throttle valve is determined only on the basis of the slip condition of the driving wheels. In other words, in previously known arrangements, the control of virtual output torque does not sufficiently compensate for the variation in degree and rate of change in the output torque resulting from the various driving conditions of the internal combustion engine. Hence, the output torque cannot be regularly restrained to the proper extent, even when the slip on the wheels occasionally occurs in the same condition, while the internal combustion engine runs in different speeds.

SUMMARY OF THE INVENTION

Accordingly, an object of the present invention is to provide an acceleration slip control device, which can determine the control quantity for the throttle valve angle not only on the basis of the slip condition occurring on the driving wheels, but also on the basis of the output torque changeability, i.e. variation in the degree and rate of change in output torque, with respect to the throttle valve angle modification, wherein the changeability thereof depends on the internal combustion engine speeds. The responsiveness thereof will be more stabilized and effective during vehicle acceleration in accordance with the present invention.

Concisely disclosing the present invention, the acceleration slip control device functions in such a way, that the control quantity, which is evaluated on the basis of the detected slip condition, is modified in regard to the running condition of the internal combustion engine and then the throttle valve is operated to take the optimum angle. Thereby the output torque can be effectively restrained to the optimum amount responsive to the slip condition without being adversely affected by the variation in output torque deterioration manner even under the prescribed condition of the internal combustion engine.

The fundamental constitution of the present invention is first illustrated in FIG. 1. The acceleration slip controller embodied herein comprises a throttle valve M3, which is located in an intake passage M2 in order to open or close the passage to an internal combustion engine M1. It further comprises a slip condition detecting means M6 which detects the slip condition of the driving wheels M4. This slip condition is determined by contemplating the rotational speed or acceleration detected therefrom as parameters. It also comprises a control quantity determination means M7 which evaluates the control quantity in order for operating the throttle valve angle in accordance with the slip condition, and the throttle valve operating means M8 which opens or closes the throttle valve M3 according to the commanded control quantity evaluated by M7. The output torque of the internal combustion engine is thus controlled and restrained to the adequate extent in compliance with the slip condition. It moreover comprises, as a distinguished characteristic of the present invention, a driving condition detecting means M9 which detects the driving condition of the internal combustion engine, namely estimates the running condition of the engine with regard to the output torque changeability and the throttle valve angle, and a control quantity correction means M10 which modifies the control quantity in compliance with the running condition detected by M9.

The slip condition detecting means M6 uses the rotational speed or rotational acceleration of the wheels as parameters so that the slip condition detecting means M6 evaluates the slipping condition of the driving wheels M4. In particular, it determines the desired rotational speed of the driving wheels M4 which can produce the best slip ratio for the particular driving speed at that time and calculates the deviation of the actual rotational speed of M4 and the desired rotational speed. The deviation thereof can be presented as a parameter indicative of the slip condition of M4.

Generally, the slip ratio is derived from the following formula;

$$\frac{(\text{driving speed} - \text{rotational speed of the driving wheel})}{\text{rotational speed of the driving wheel}}$$

and it is desirably set from −0.1 to −0.2.

Alternatively a certain acceleration value which produces the desired slip ratio on the driving wheel M4 may be predetermined. In this case, the deviation of the virtual rotational acceleration of driving wheels M4 and the predetermined acceleration value may be utilized as a parameter indicative of slip condition.

M7, the control quantity determination means, estimates the opening angle of the throttle valve M3 in response to the slip condition evaluated by M6. The desired angle of M3 or the desired rotary velocity thereof is to be calculated.

M9, the driving condition detecting means, detects the running condition of the internal combustion engine M1, by detecting a parameter indicative of the output torque changeability with regard to the throttle valve angle displacement. For example, parameters such as engine speed, the throttle valve angle and the like can be detected, to indicate the driving condition of the engine. Since such parameters largely affect the output torque changeability, i.e. degree and rate of change with respect to the throttle valve angle, M9 estimates the impact of those parameters on the output torque changeability in order to modify the control quantity for the throttle valve responsive thereto.

M10, the control quantity correction means, modifies the control quantity for the throttle valve M3, which is evaluated by M7 only on the basis of slip condition of driving wheel M4. The modification is made in relation to the other parameters affecting the internal combustion engine, namely some other parameters indicative of output torque changeability, which are evaluated by M9. The output torque of the internal combustion engine M1 can be thus effectively restrained by such modification. In particular, a correction coefficient can be set up according to M9 detection in order for such additional parameters to be calculated, so that the most adequate control quantity evaluation can be made.

Therefore in the invention disclosed herein, the throttle valve control quantity estimated by M7, which is derived only on the basis of the slip condition of M4, is modified in accordance with the running condition of M1 detected by M9, so that the angle of the throttle valve M3 can be adjusted so as to achieve optimum performance. The output torque of the internal combustion engine can be restrained to an optimum amount without exception, even when the running condition is such that the output torque is less deteriorated by throttle valve angle displacements.

BRIEF DESCRIPTION OF THE ACCOMPANIED DRAWINGS

The above and other object of the invention will be more clarified in conjunction with the attached drawings, in which:

FIG. 5 is a table which is utilized to figure out the correction coefficient K;

Figure 7:
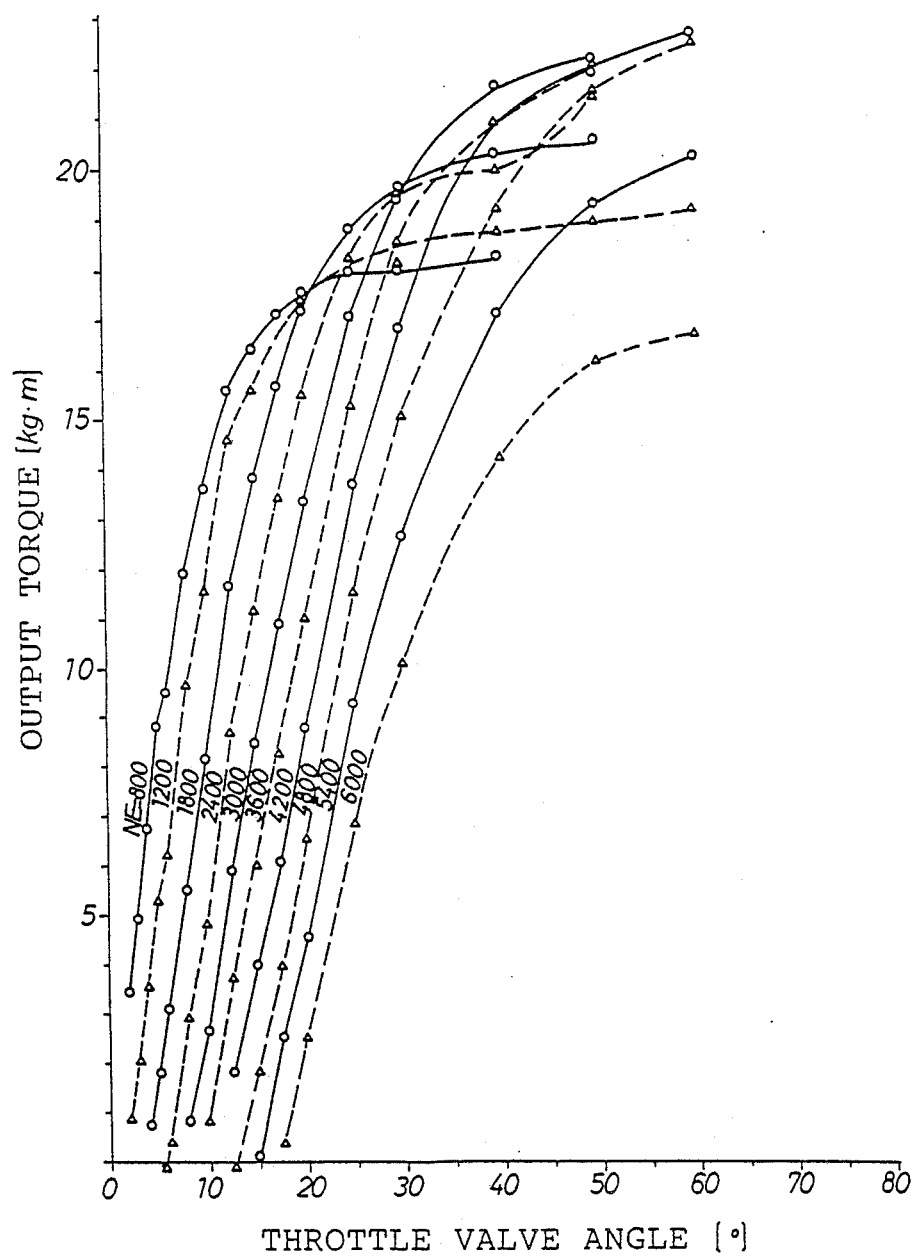

FIG. 7 graphically shows the relationship between the output torque of the internal combustion engine and the throttle valve angle, at various engine speed, i.e. various driving conditions.

DETAILED DESCRIPTION OF THE PREFERRED EMBODIMENT

The detailed description of the preferred embodiment noted hereinbelow will give a deeper comprehension of the present invention in reference with the accompanied drawings introduced above.

Figure 1:
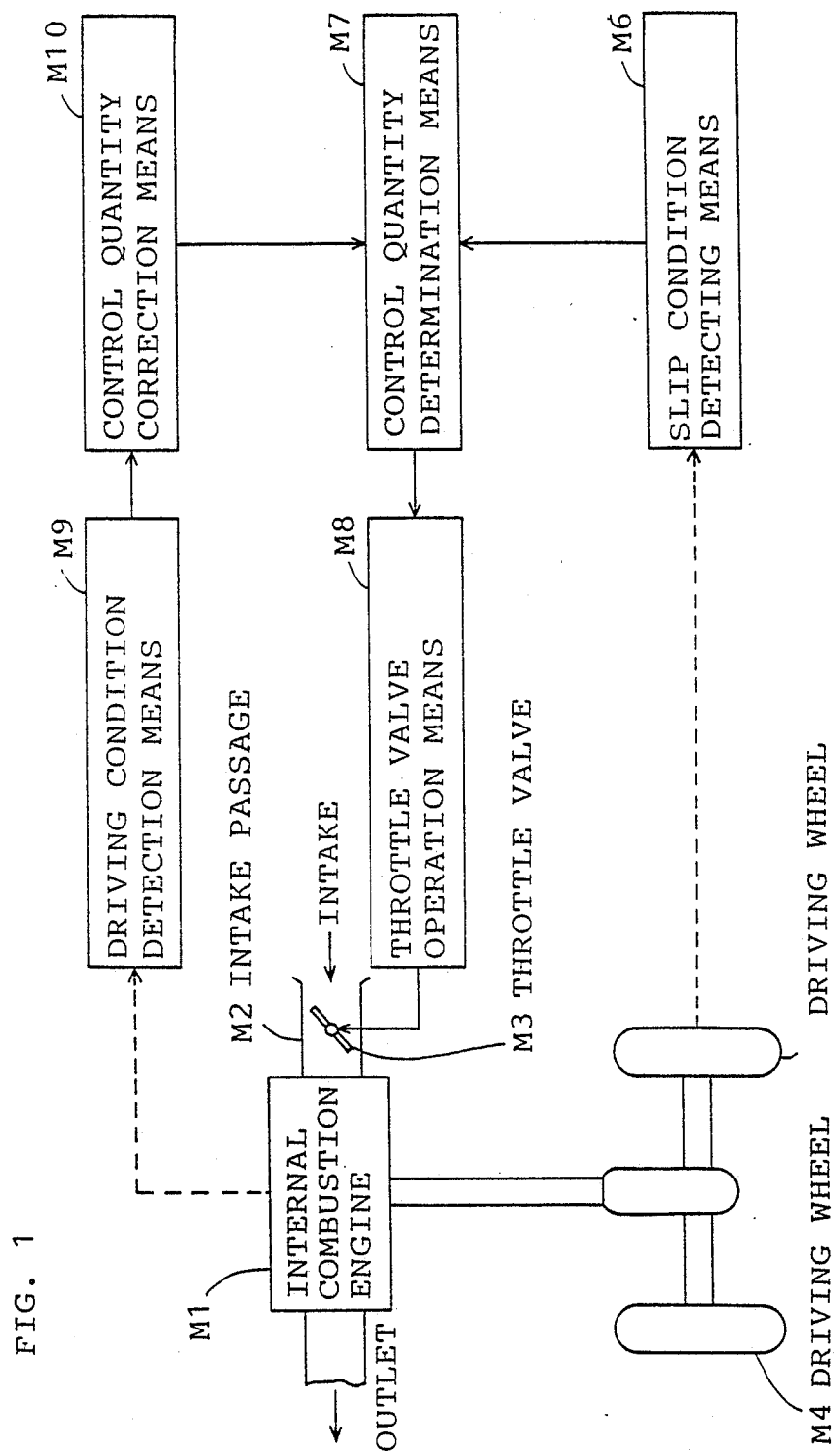
FIG. 1 is a block diagram briefly summarizing the principles of the present invention.
Figure 2:
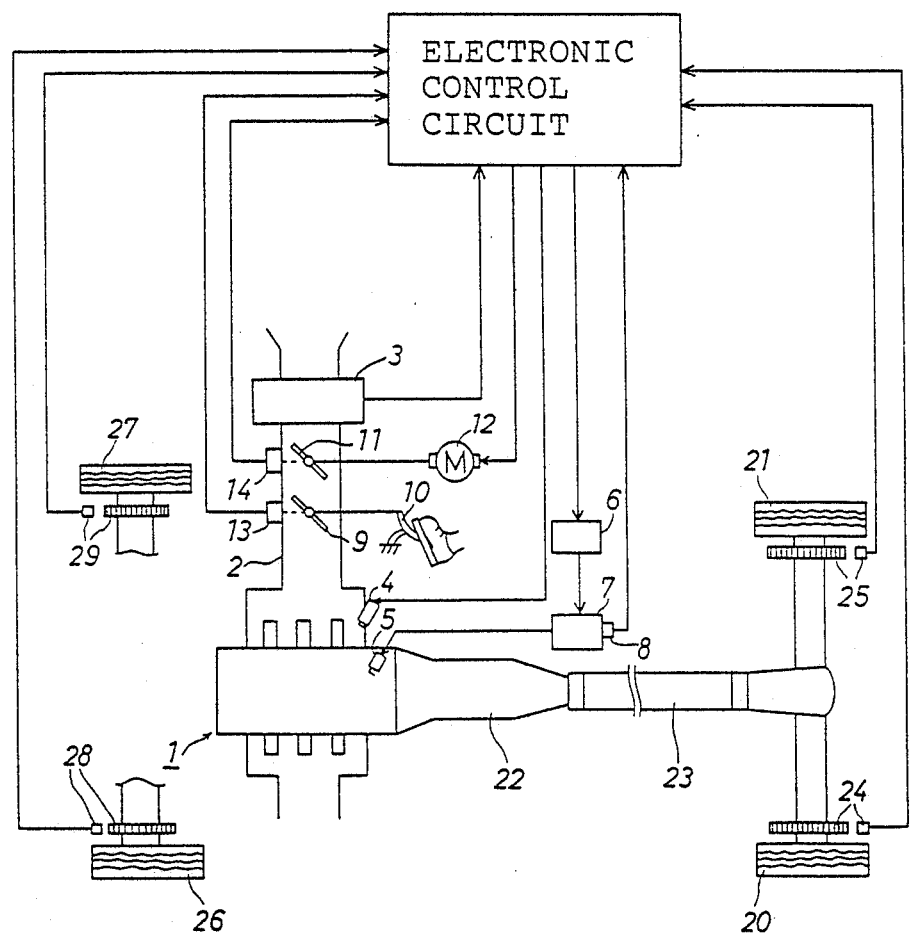
FIG. 2 shows one embodiment of the present invention.

FIG. 2 schematically illustrates the present embodiment, which is applied to a front engine rear drive type vehicle with a gasoline engine. In the illustration, numeral 1 indicates a four cylinder fuel injection engine connected to an intake pipe 2 and an air-flow meter 3. A fuel injection valve 4 is mounted to each cylinder for injecting fuel into air taken into the cylinder. Although for the purpose of the disclosure, only a single ignition valve is shown herein for single cylinder component. Numeral 5 indicates an ignition plug, to which an igniter 6 and a distributor 7 are connected. The igniter 6 generates a high voltage, which is distributed to each ignition plug 5 by the distributor 7. An engine speed sensor 8 is attached to the distributor 7 in order to detect the engine speed. In the passage, a main throttle valve 9 is provided for regulating intake flow, which is operated responsive to a depression of an acceleration pedal 10. Also in the passage, an auxiliary throttle valve 11 is provided between an intake port and the main throttle valve 9, which regulates the intake flow during the present acceleration control. A main throttle sensor 13 and an auxiliary throttle sensor 14 are provided along the passage, for detecting the angle of the main throttle valve 9 and the angle of the auxiliary throttle valve 11 respectively. Both of the throttle sensors 13 and 14 output signals indicative of the throttle valve angle detected.

Power produced by the internal combustion engine 1 is transmitted to the right and left driving wheels 20 and 21 via a transmission 22 and a propeller shaft 23. The driving wheels 21 and 22 are respectively supplied with left and right driving wheel speed sensors 24 and 25. Similarly driven wheels 26 and 27 are respectively supplied with left and right driven wheel speed sensors 28 and 29. Such sensors 24, 25, 28 and 29 comprise gears and electromagnetic pickups. The electronic parts and devices mentioned hereinbefore are controlled by an electronic control circuit 30, which is described in detail below, with reference to FIG. 3.

Figure 3:
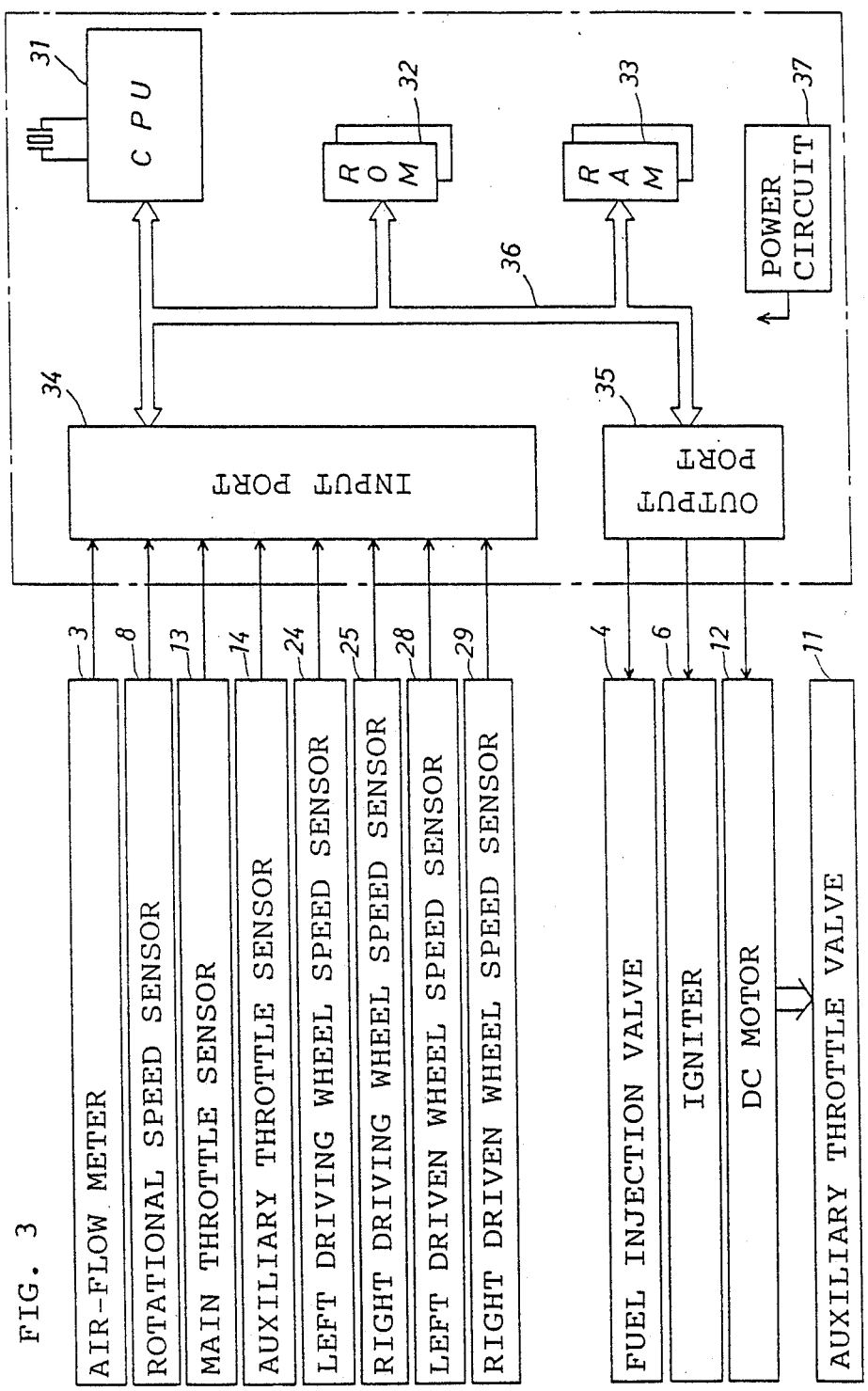
FIG. 3 is a block diagram illustrating the electronic control circuit.

The electronic control circuit 30 comprises microcomputers, as illustrated by the diagram in FIG. 3. The central processing unit (CPU) 31 receives data detected by the aforementioned various sensors and processes calculations in accordance with a control program stored in a read only memory (ROM) 32 as well as with the other data such as map. A random access memory (RAM) 33 temporarily reads or writes data from sensors or data necessary for calculations. An input port 34 has a multiplexer and such which selectively supplies output signals from sensors or from a waveform shaping circuit to the CPU 31. An output port 35 has a drive circuit activating a DC motor 12 responsive to a control signal from the CPU 31. The CPU, ROM, RAM, input port and output port are associated with each other by a bus line 36 as shown in the diagram, and a power circuit 37 provides each of them with electricity.

As a fundamental purpose of the present invention, the CPU 30 performs the acceleration control in such a way that it receives detected data from the various sensors and outputs a drive signal to DC motor 12 such that the angle of the throttle valve is adjusted by the DC motor 12 so that the output torque is restricted properly and the acceleration can be reconditioned. Further, the CPU 30 also executes conventional engine control functions such as controlling the injection quantity or the ignition timing according to the running condition of the engine 1, as detected by the air-flow meter 3 or engine speed sensor 8 and so on.

Figure 4:
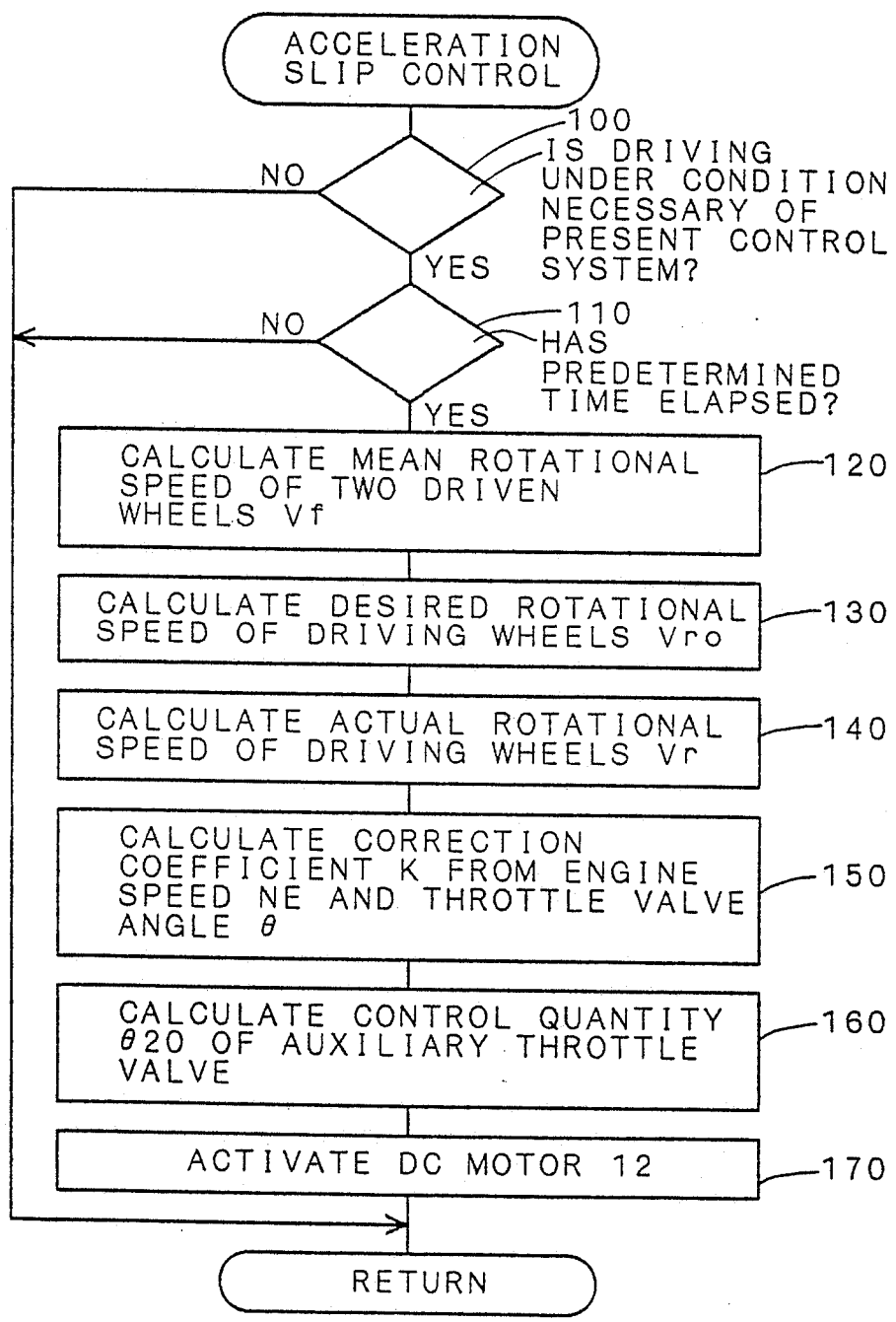
FIG. 4 is a flow chart showing the acceleration slip control process, which is executed in the electronic control circuit of FIG. 3.

The flow chart of FIG. 4 describes the detailed control process for acceleration slip which is carried out in the CPU 30.

The control process begins at step 100 wherein a determination is made as to whether or not the acceleration slip control system is required by the detected driving condition. If this step determines that the acceleration slip control need not be performed, for example in driving conditions where the main throttle valve 11 is fully closed, the transmission 22 is set in a neutral position, the vehicle is not under the condition the acceleration slip can never happen, or when either the DC motor 12 or the drive system for the auxiliary throttle valve 11 are damaged, the step 100 thereby determines either that the acceleration slip control is necessary or that proper control cannot be executed under such conditions. The present routine is therefore abandoned in such events.

When, at step 100, it is determined that the detected driving conditions necessitate performance of the acceleration slip control routine, the next step 110 judges whether or not the predetermined time has already elapsed since the last run of the control routine had finished. For instance, step 110 judges if 8 msec. has passed since that time. This judgment means that the acceleration slip control, which essentially begins at step 120, should be periodically processed.

Step 120 starts the actual counteractive process for acceleration slip, hence, a mean rotational speed of the driven wheels 26 and 27, i.e. Vf, is calculated on the basis of the information detected by the left and right driven wheels speed sensors 28 and 29. The next step 130 calculates a desired rotational speed of driving wheels Vro in accordance with the actual mean rotational speed Vf.

This calculation is fundamentally based on the following facts. When the vehicle accelerates, the driven wheels 26 and 27 do not slip and their mean rotational speed Vf fairly indicates the vehicle's own running speed. On the other hand, acceleration is obtained when the driving wheels 20 and 21 rotate faster than the vehicle's own running speed, namely smooth acceleration is obtained when the frictional force increases between the driving wheels and the tractive surface. Particularly, the most preferable acceleration is obtained when the driving wheel's rotational speed is 1.1 to 1.2 times faster than the vehicle's running speed. Therefore Vro is calculated by multiplying Vf by a coefficient selected to produce the desired accleration. In this embodiment, Vro is derived by 1.12 times multiplying Vf.

Step 140 then determines the actual rotational speed Vr of the driving wheels 20 and 21 on the basis of the information detected by left and right driving wheels speed sensors 24 and 25. The sequential step 150 obtains a correction coefficient K by an interpolation utilizing a table shown in FIG. 5. In this table, the coefficients corresponding further to NE=5600 and $\theta=36°$ should be understood to be similar to the coefficients upon NE=5600 and $\theta=36°$, however, the table does not show values furthermore. This data map comprises two parameters i.e. engine speed NE which is detected by the engine speed sensor 8 and throttle angle $\theta$. The main and auxiliary throttle sensors 13 and 14 detect $\theta1$ and $\theta2$ respectively, between which a smaller value is optionally taken up to read the table. The correction coefficient K is derived in order for step 160 to obtain the control quantity of the auxiliary throttle valve 11, however in this embodiment, the rotary velocity $\dot\theta2°$ of the auxiliary throttle valve 11 is to be obtained.

Further at step 160, the following formula is used to calculate the control quantity for the auxiliary throttle valve 11, i.e. its rotary velocity $\dot\theta2°$;

$$\dot\theta2° = K\{\alpha\cdot\Delta V + \beta\cdot\Delta\dot V\}$$

$\Delta V$: Vro−Vr
$\alpha, \beta$: coefficients

In this embodiment, the coefficients $\alpha$ and $\beta$ are determined to be 0.81 and 0 respectively while braking, and to be 0.98 and 12 respectively while brake is off operating. Such values are obtained by the road test.

At step 170 the DC motor 12 is activated in accordance with the above-obtained rotary velocity $\dot\theta2°$ of the auxiliary throttle valve 11, and thereby the present routine is concluded.

This routine described hereinbefore as steps 120 to 170 is periodically performed under the condition wherein the acceleration slip control is needed. The control quantity of the throttle valve is thereby determined, forwarding the DC motor into operation, and the actual rotation speed Vr can be desirably controlled to Vro. Particularly in the present embodiment, the output torque of the engine can be restrained to the optimum power, which is attributed to the modification especially embodied by the invention. It may be easily contrasted that the conventional control method could restrain the power thereof only according to the deviation ΔV.

Figure 6:
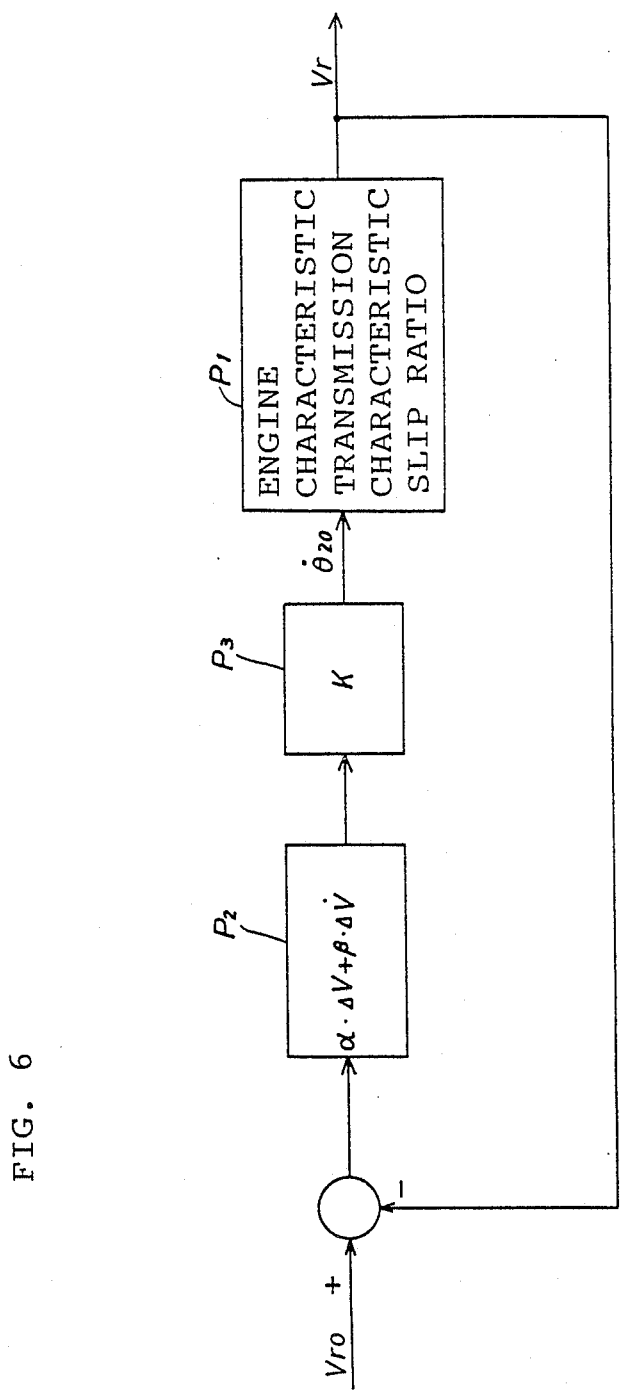
FIG. 6 is a block diagram illustrating the acceleration slip control embodied herein.

An advantage of the present invention will be more clearly understood in reference with FIG. 6, which diagrammatically indicates how the outstanding modification can be made. P1 shows that the rotational speed of the driving wheels Vr is usually decided depending on an engine characteristic, a transmission characteristic transmitting the power from the engine to the wheels, and the slip ratio between the wheels and the tractive surface. However in the present embodiment, the rotary velocity of the auxiliary throttle valve $\theta 2°$ is derived by contemplating the deviation ΔV and the coefficients α and β, namely illustrated as P2. Moreover the $\theta 2°$ is modified into the optimum value by the utilization of the correction coefficient K, namely illustrated as P3. As mentioned before, the correction coefficient K compensates for the variation in engine torque resulting from the variation in the auxiliary throttle valve angle. This means that the control quantity for the auxiliary throttle valve can be obtained not only by the vehicle's transmission system characteristic but also by the engine's own characteristics, thereby the output torque of the engine can be effectively restrained to the optimum value.

Moreover, the correction coefficient K and the coefficients α and β may be predetermined according to the engine type or the vehicle type in case to case, so that the present embodiment is broadly and easily applicable to any type of vehicles.

Alternatively the control quantity may be obtained by an integration of the above-mentioned formula producing the desired optimum angle of the auxiliary throttle valve $\theta 2°$, i.e., $$\theta 2° = K\{\alpha \cdot \Delta V \cdot dt + \beta \cdot \Delta \dot{V}\} + c$$

The derived $\theta 2°$ may be merely utilized as the desired angle of the auxiliary throttle valve 11 instead of the rotary velocity embodied herein, in order to control the valve angle.

Further as another alternative, the correction coefficient K may be formed by single parameter, the throttle valve angle θ. Otherwise instead of the engine speed NE to figure out the correction coefficient K, the vehicle's running speed SPD or a shift position of the transmission GRP may be used as a parameter. An engine intake air volume may be estimated from the parameters, i.e., SPD, GRP and the throttle valve angle θ. In this case, a manifold negative pressure may be alternatively substituted for the throttle valve angle θ.

Furthermore as a significant alternative, a single throttle valve not associated with the acceleration pedal 10 may be mounted in the intake passage 2, instead of using two throttle valves, only one of which is not associated with the acceleration pedal 10, is to be utilized for the acceleration slip control. When only a single throttle valve is used, the control quantity of the throttle valve will be determined in accordance with the depression of the acceleration pedal 10, and situationally, the control quantity which makes the angle smaller will be selectively taken up compared with the control quantity determined on the basis of the slip condition.

What is claimed is:

1. A control system for preventing a slip comprising:
   slip detection means for detecting a driving wheel speed and providing a first signal corresponding thereto and for determining whether or not said slip occurs based on said first signal;
   engine intake air volume estimation means for estimating an intake air volume of an internal combustion engine and providing a second signal corresponding thereto;
   desired engine output determination means, receiving said first and second signals when said slip occurs for determining a desired engine output in response to at least said first signal and modifying said desired engine output in response to said second signal; and
   engine output control means responsive to said desired engine output determination means for controlling an engine output to approach said modified desired engine output.

2. A control system for preventing a slip according to claim 1, wherein said engine intake air volume estimation means includes:
   engine speed detection means for detecting an engine speed and providing a third signal corresponding thereto;
   engine load detection means for detecting an engine load and providing a fourth signal corresponding thereto; and
   means for estimating said intake air volume in response to said third and fourth signals.

3. A control system for preventing a slip according to claim 1, wherein said engine intake air volume estimation means includes:
   means for detecting a shift position of a transmission and a vehicle speed and providing a fifth signal corresponding thereto;
   engine load detection means for detecting an engine load and providing a sixth signal corresponding thereto; and
   means for estimating said intake air volume in response to said fifth and sixth signals.

4. A control system for preventing a slip according to claim 2, wherein a throttle position of a throttle valve member is used to detect said engine load.

5. A control system for preventing a slip according to claim 2, wherein a negative pressure of an intake manifold is used to detect said engine load.

6. A control system for preventing a slip according to claim 1, wherein said engine output control means includes a throttle valve member adapted to be coupled in an intake passage of said engine for controlling said engine output.

7. A control system for preventing a slip according to claim 6, wherein said modified desired engine output is used to determine an optimum position of said throttle valve member.

8. A control system for preventing a slip according to claim 6, wherein said modified desired engine output is used to determine an optimum rotary velocity speed of said throttle valve member.

9. A control system for preventing a slip according to claim 1, wherein a driving wheel acceleration speed is used to determine said slip.

* * * * *